United States Patent Office 2,761,856
Patented Sept. 4, 1956

2,761,856

SULFONATED METHYLOL ACRYLAMIDE COPOLYMERS

Tzeng-Jiueq Suen and Arthur M. Schiller, Stamford, Conn., assignors to American Cyanamid Company, New York, N. Y., a corporation of Maine No Drawing. Application June 20, 1952,
Serial No. 294,724

10 Claims. (Cl. 260—79.3)

This invention relates to new and useful synthetic materials and to methods of preparing the same. More particularly it relates to anionic copolymers prepared from ingredients including (1) an N-methylol acrylamide compound having the formula

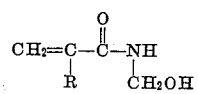

wherein R is selected from the group consisting of hydrogen and methyl, (2) a comonomer having a $CH_2=C<$ grouping and a boiling point of at least 60° C. and (3) a sulfurous acid compound selected from the group consisting of sulfurous acid and its water-soluble salts.

It is an object of this invention to prepare a new class of synthetic copolymers which have particular utility in the coating and impregnating arts as such or as components of coating and impregnating compositions, or as intermediates in the preparation of other resinous materials which are especially suitable for use in such fields.

Another object of this invention is to provide economical and efficient methods by which the new synthetic materials described hereinabove may be prepared.

The new synthetic materials of this invention may be classed broadly as anionic copolymers of a sulfonated N-methylol acrylamide.

The copolymers of our invention are prepared by a method which comprises the steps of copolymerizing a compound having the formula

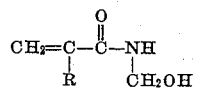

wherein R is hydrogen or methyl, and a comonomer having a $CH_2=C<$ grouping, a boiling point of at least 60° C. and which forms, when homopolymerized, a polymer that is substantially insoluble in water reacting the thus-formed copolymer with a sulfurous acid compound selected from the group consisting of sulfurous acid and its water-insoluble salts. Among the suitable comonomers are styrene; alkyl acrylates, e. g., methyl acrylate, n-octyl acrylate; vinyl halides, e. g., vinyl chloride; vinyl esters of carboxylic acids, e. g., vinyl acetate, vinyl propionate; alkyl methacrylates, e. g., methyl methacrylate, acrylonitrile; and halogenated or alkylated styrenes, e. g., p-chlorostyrene, α-chloro-styrene, α-methyl-styrene, p-methyl-styrene; etc.

The proportions of the ingredients of the anionic copolymers may be widely varied. The weight ratio of N-methylol acrylamide compound to the comonomer may vary from 1/99 to 99/1. It is preferred, however, that the N-methylol acrylamide compound be employed in an amount at least equal to about 5% of the total weight of monomers. The amount of sulfurous acid compound to be employed is based on the amount of N-methylol acrylamide compound in the polymer. The molar proportion of sulfurous acid compound to N-methylol acrylamide in the polymer, according to the teachings of this invention, may vary from 0.05/1 to 1/1, and preferably is at least 0.1/1.

The selection of the proportion of ingredients will be controlled primarily by the properties desired in the final product. The water sensitivity of the copolymers is particularly influenced by the proportions of ingredients. The copolymers which contain a high percentage of N-methylol acrylamide will be water-soluble whereas the polymers which contain a high percentage of the other comonomer will be relatively water insensitive. The reaction of the copolymer with the sulfurous acid compound also tends to promote water-solubility and consequently the greater the proportion of sulfurous acid compound the greater will be the water sensitivity of the final copolymer. By judicious proportioning of the ingredients, copolymers having a wide variety of properties may be obtained.

The limitations on the hereinabove described process are few. The copolymerization of the N-methylol acrylamide component and the aforesaid comonomer may be conveniently accomplished by merely mixing the two monomers in aqueous medium. The copolymerization will take place at room temperature. However, it is preferred to employ a mild heating generally in the range of 30° to 100° C. In most instances it is desirable to employ an emulsifying agent and a catalyst to aid the copolymerization. An emulsifying agent is particularly desirable when the proportions of ingredients are such that the ultimate polymer is water-insoluble. In such cases the product formed is an emulsion of copolymer in water. However, in other instances, that is when high proportions of the N-methylol acrylamide compound and/or sulfurous acid compound are employed the product is water-soluble.

As indicated previously a suitable catalyst is often desirable in the polymerization step in order to obtain a reaction speed which is commercially feasible. The various water-soluble per-oxygen compounds are particularly suitable in the practice of this invention. For example, the various peroxides, e. g., urea-peroxide, hydrogen-peroxide, potassium-peroxide, sodium-peroxide and the like may be used. Other suitable catalysts include sodium persulfate, potassium persulfate, sodium perborate, peracetic acid and the like. Still other catalysts such as complex catalysts made from a ferrous or ferric salt and hydrogen peroxide as disclosed in U. S. Patent No. 2,508,341 may be used. It is also possible to employ water insoluble oxygen yielding catalysts such as benzoyl peroxide, tertiary butyl hydroperoxide, lauryl peroxide and acryl peroxide. The concentration of catalysts employed is usually small, e. g., from about 1 to about 20 parts of catalysts per thousand parts of the reactive mixture. If an inhibitor be present up to 5% or even more of the catalyst may be necessary according to the concentration of the inhibitor.

In those cases where the employment of an emulsifying agent is desirable it is preferred to employ an emulsifier which is not cationic in order that the emulsifier will not detract from or interfere with the formation of an anionic copolymer. Suitable compatible emulsifiers which may be used may be selected from the following types: diamyl, dihexyl, or dioctyl sulfosuccinic esters and salts thereof, salts of alkylated naphthalene sulfonic acids, sulfonated or sulphated higher alcohols, e. g., lauryl sulfate, the salts of the sulfonated or sulphated higher alcohols, sulfonated oils, glycol oleates and linoleates, mineral oil sulfonates, aromatic sulfonates, wax acid soaps, triethanolamine soaps such as the oleate, monoglycerol linoleate, amino sulfonates and sulfates, ammoniacal or other alkaline caseins, soaps, lecithin, cholesterol, saponin, emulsifying gums such as gum arabic, gelatin, etc.

Obviously, various mixtures of these emulsifiers and/or wetting agents may be employed in order to obtain suitable stability of the emulsions for the particular purpose for which the composition is intended. For some purposes, a quick breaking emulsion will be more desirable, while for other purposes a very stable emulsion will be required. By judiciously selecting the emulsifier, or combination of emulsifiers and the concentration thereof, an emulsion may be produced with suitable characteristics for any particular purpose. The present invention is not limited to the use of any particular proportion of emulsifying agent. In general, we prefer to use from 1 to 5 percent of the emulsifying agent based on the weight of monomers to be emulsified but commercially attractive stable emulsions may be obtained if this figure is varied from 0.1% to 25%. The optimum concentration depends primarily upon the materials to be emulsified although other factors such as agitation have a decided effect.

The amount of water to be employed as a medium for copolymerization is not critical and is capable of wide variation. As little as 50% water, based on the total weight of water and monomers, may be used, while there is no actual limitation to the upper limit of water content, this being a practical matter governed by the desired content of solids in the final emulsion. The optimum amount of water used depends on, among other things, the nature of the copolymer, extent of the exothermic heat of reaction and the degree of polymerization.

The emulsion polymerization reaction of this invention is preferably performed at a pH of approximate neutrality, i. e., between about pH 4.0 and 9.0.

The reaction of the copolymer with the sulfurous acid compound will likewise take place upon mere mixing of the two ingredients. However, since the reaction proceeds in accordance with the general laws of chemistry and takes place faster at higher temperatures it is preferred to heat the materials at a temperature between 30° C. and 100° C.

The following examples are set forth primarily for the purpose of illustration, and any specific enumeration of detail should not be interpreted as a limitation on the invention except as indicated in the appended claims. In the examples parts are by weight unless otherwise specified.

*Example 1*

Into a reaction vessel equipped with a thermometer, stirrer and reflux condenser were placed 310 parts of deionized water followed by 0.67 part of sodium bicarbonate and 7.2 parts of dioctyl sodium sulfosuccinate. The solution was then heated to 90° C. and 10 parts of a 1% ammonium persulfate solution was added. A mixture of 216 parts of styrene and 24 parts of N-methylol acrylamide was added dropwise over a period of two hours. During the addition of the monomers 40 parts of a 1% ammonium persulfate solution was added in 10-part portions. The temperature during the monomer addition was maintained at reflux. The polymerization was allowed to progress for a period of approximately 2 hours at which point it was practically complete. To the resulting emulsion there was next added 22.6 parts of sodium metabisulfite, maintaining the temperature of the mixture at 60 to 70° C. for a period of 20 minutes. The final product was a milky emulsion. The copolymer thus prepared was effective as an anti-static agent on textile fibers.

*Example 2*

An emulsion copolymer was prepared at 10% solids in water from 30 parts of N-methylolacrylamide and 70 parts of ethylacrylate in the same manner as in Example 1. Thereafter 200 parts of the thus-formed emulsion copolymer was reacted with 4.5 parts of sodium metabisulfite by heating for approximately 30 minutes on a steam bath. The product thus prepared was a cloudy, somewhat viscous emulsion and was effective as an anti-static agent on textile fibers.

*Example 3*

An emulsion copolymer is prepared at 20% solids in water from 40 parts of N-methylolacrylamide and 60 parts of styrene in the same manner as in Example 1. 200 parts of the copolymer emulsion is thereafter reacted with 4.5 parts of sodium metabisulfite at 60 to 70° C. for 20 minutes. The resulting anionic emulsion copolymer was effective as an anti-static agent for textile fibers.

There was prepared a sheet of paper with a basis weight of 48 lb. (25" x 40"—500) formed from cellulosic pulp impregnated in the beater with 3% of the anionic copolymer and 3% of alum. After heating the sheet for 10 minutes at 260° F. the paper handsheet had a wet tensile strength of 6.5 lbs. per inch, which is about one-fourth of the dry tensile strength.

*Example 4*

Into a suitable reaction vessel equipped with a stirrer, reflux condenser and thermometer, there were placed one thousand parts of deionized water and 5 parts of potassium persulfate. There was then added 115 parts of N-methylol α-methylacrylamide and 65 parts of vinyl acetate. The mixture was buffered to a pH of 7 with sodium acid phosphate and 10 parts of sodium lauryl sulfate was added. The mixture was stirred and allowed to copolymerize by heating at a temperature of 60–70° C. until no appreciable increase in the viscosity of the emulsion was observed. There was thereby formed an aqueous emulsion copolymer of moderately high viscosity. There was then added 95 parts of sodium metabisulfite and the mixture was again stirred while heating to a temperature of about 40° C. for 60 minutes to obtain a dispersion of the polymer in water.

*Example 5*

Into a reaction vessel equipped with a thermometer, stirrer and reflux condenser, there were placed 101 parts of N-methylol acrylamide, 1000 parts of deionized water and 10 parts of vinyl chloride. To this mixture, there was then added 5 parts of sodium persulfate in aqueous solution and 10 parts of sodium lauryl sulfate in aqueous solution. The mixture was then buffered to a pH of 7.0 with sodium acid phosphate. The mixture was then agitated and heated to a temperature of approximately 80° C. and maintained at that temperature for a period of approximately 1 hour. Next, there was added 70 parts of trimethylamine sulfite. The mixture was heated at a temperature of about 60° C. for approximately ½ hour. The final product was a turbid solution of anionic copolymer.

*Example 6*

A copolymer was prepared from 101 parts of N-methylol acrylamide and five parts of acrylonitrile following the procedure of the preceeding example. The copolymer thus prepared was reacted with 20 parts of ammonium bisulfite by heating at a temperature of 50° C. for approximately 40 minutes. There was again obtained a hazy solution of an anionic copolymer.

*Example 7*

A copolymer was prepared according to the procedure of Example 5 from 101 parts of N-methylol acrylamide and 10 parts of α-chlorostyrene. The mixture was maintained at a temperature of 80° C. and sulfur dioxide was bubbled through the reaction until approximately 20 parts of sulfur dioxide had been absorbed. The final product was a turbid solution of an anionic copolymer.

As can be seen from the preceding definition, the N-methylol acrylamide compound may be either N-methylol acrylamide or N-methylol α-methylacrylamide. Such a compound may be conveniently prepared by the reaction of formaldehyde with the corresponding acrylamide in approximately stoichiometric proportions.

As a compound selected from the group consisting of sulfurous acid and its water-soluble salts, it is preferred to employ in most instances salts of the alkali metals. From the standpoint of cost and availability, sodium salts, especially sodium metabisulfite of commerce are particularly useful. Each mol of sodium metabisulfite is equivalent to two mols of sodium bisulfite. In addition to using the alkali metal salts, i. e. potassium, sodium or lithium salts, we may also use ammonium and water-soluble tertiary amine salts of sulfurous acid such as ammonium bisulfite or trimethylamine sulfite.

The modification of the copolymers through reaction with sulfurous acid or a water soluble salt thereof is a vital and important feature of this invention. The sulfurous acid compound reacts with the methylol groups of the copolymer with the elimination of water whereby the formation of sulfonate groups is effected. The modification of the copolymer through reaction with the sulfurous acid compound has a great influence upon the final properties of the copolymer. For example, the sulfurous acid compound imparts anionic properties to the copolymer, increases its hydrophilic character and sensitivity, and in other ways modifies its properties both physical and chemical.

The copolymers prepared according to the present invention may have pigments or dyes incorporated therein. For example, they may be colored by the addition of carbon black, iron blue, chrome yellow, lithopone, and the like. Similarly, if desired, various plasticizers and/or thickeners such as water-soluble methylated cellulose ethers may be added.

The copolymers prepared according to the present invention, especially in the form of emulsions and solutions, find wide application for a variety of purposes. Particularly outstanding is the ability of the copolymers to act as antistatic agents for fibers, fabrics, and sheets of natural or synthetic materials, e. g., cellulose esters, regenerated cellulose, nylon, wool and the like. Also outstanding is the ability of the copolymers to impart greatly improved wet strength when used as impregnants for paper and similar materials. In addition the copolymers are useful as drilling mud additives, as aggregating agents for soil conditioning and for soil stabilizing, as protective colloids, and as surface-active agents.

Further modifications may be made in the copolymers of this invention by persons skilled in the art without departing from the spirit and scope of the invention. Within the scope of the invention, various permutations and combinations of ingredients may be employed. For example, we may employ a mixture of various sulfurous acid compounds or a mixture of various hydrophobic monomers as starting materials. Still other modifications will be apparent to the routineer in the art.

Reference is hereby made to our copending application Serial No. 294,725 filed concurrently in which there is described and claimed the polymeric reaction product of an acrylamide compound, formaldehyde, and a sulfurous acid compound selected from the group consisting of sulfurous acid and its water-soluble salts.

It is our intention to cover all changes and modifications of the examples of this invention herein chosen for purposes of the disclosure, which do not constitute departure from the spirit and scope of this invention.

What is claimed is:

1. A sulfonated copolymer which comprises the product of reacting a sulfurous acid compound of the group consisting of sulfurous acid and its water-soluble salts with a copolymer comprising essentially an amide having the formula

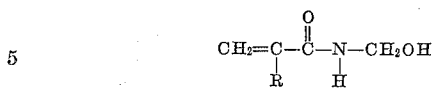

wherein R is a radical of the group consisting of hydrogen and methyl radicals, and a co-monomer with a boiling point of at least 60° C. containing a $CH_2=C<$ group and which forms when homopolymerized a substantially water-insoluble substance, wherein the weight ratio of said amide to said co-monomer is from 1/99 to 99/1 and the molar ratio of combined sulfurous acid compound to said amide is from about 0.05/1 to 1/1.

2. A sulfonated copolymer according to claim 1 in which the weight ratio of said amide to said co-monomer is at least 5/95 and the molar ratio of combined sulfurous acid compound to said amide is at least 0.1/1.

3. A sulfonated copolymer according to claim 2 in which the sulfurous acid compound comprises sodium bisulfite.

4. A sulfonated copolymer according to claim 2 in which said co-monomer comprises styrene.

5. A sulfonated copolymer according to claim 2 in which said co-monomer comprises ethyl acrylate.

6. A sulfonated copolymer according to claim 2 in which said co-monomer comprises acrylonitrile.

7. A sulfonated copolymer according to claim 2 in which the sulfurous acid compound comprises sodium bisulfite and said co-monomer comprises styrene.

8. A sulfonated copolymer which comprises the product of reacting sodium bisulfite with a copolymer of substantially equal weights of N-methylol acrylamide and styrene, wherein the molar ratio of combined sodium bisulfite to N-methylol acrylamide is substantially 1/1.

9. In a method of preparing a sulfonated copolymer, the step which comprises reacting a sulfurous acid compound of the group consisting of sulfurous acid and its water-soluble salts with a copolymer comprising essentially an amide having the formula

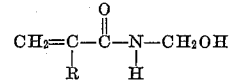

wherein "R" is a radical of the group consisting of hydrogen and methyl radicals, and a co-monomer with a boiling point of at least 60° C. containing a $CH_2=C<$ group and which forms when homopolymerized a substantially water-insoluble substance, wherein the weight ratio of said amide to said comonomer is from 1/99 to 99/1 and the molar ratio of sulfurous acid compound to said amide is at least 0.1/1 on a monomeric base.

10. A method according to claim 9 in which the weight ratio of said amide to said co-monomer is at least 5/95.

References Cited in the file of this patent
UNITED STATES PATENTS

| | | |
|---|---|---|
| 2,395,347 | Sharkey | Feb. 19, 1946 |
| 2,611,763 | Jones | Sept. 23, 1952 |
| 2,680,110 | Loughran | June 1, 1954 |

OTHER REFERENCES

Whitmore: "Organic Chemistry," pages 174, 175 (1937).